UNITED STATES PATENT OFFICE.

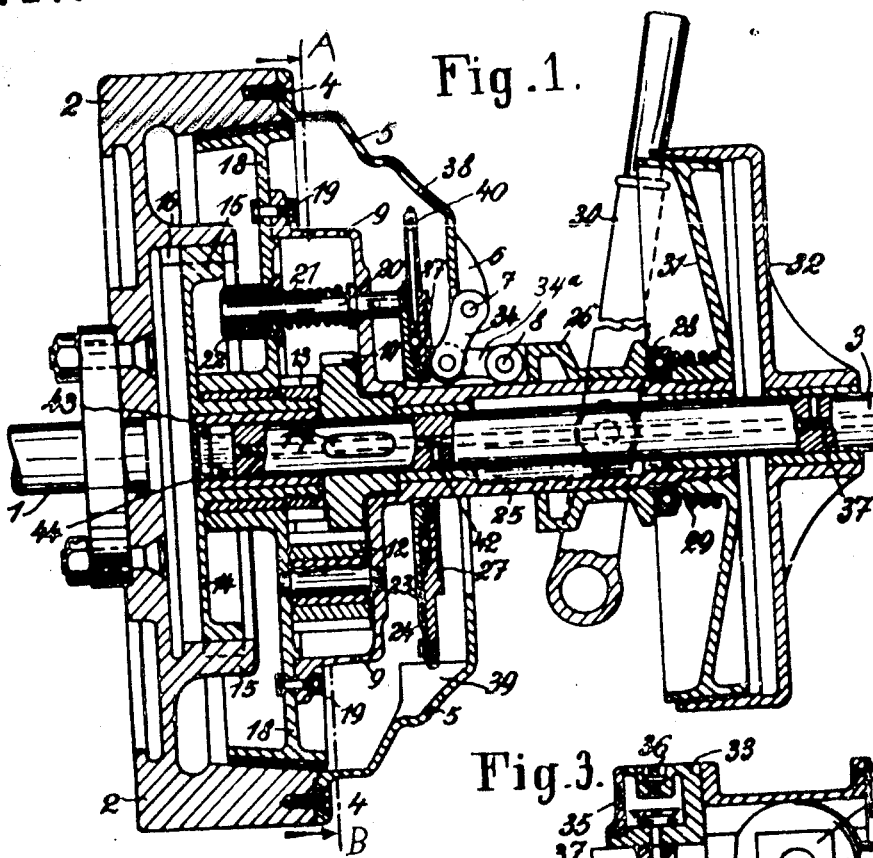

WILHELM STRUCK, OF BERLIN, GERMANY.

REVERSING-GEARING.

955,717.   Specification of Letters Patent.   Patented Apr. 19, 1910.

Application filed February 10, 1909. Serial No. 477,193.

*To all whom it may concern:*

Be it known that I, WILHELM STRUCK, subject of the Kingdom of Prussia, residing at 65 Gitschinerstrasse, Berlin, Germany, have invented new and useful Improvements in Reversing-Gearing, of which the following is a specification.

This invention relates to a clutch controlled reversing gearing which is capable of application to vehicles of all kinds, in which forward and backward motion is requisite, especially for motor boats.

The invention includes the novel features of construction and arrangement and combination of parts hereinafter described and particularly set forth in the appended claims.

An embodiment of my invention is illustrated in the accompanying drawing in which:—

Figure 1 shows a longitudinal section through the coupling and the gearing. Fig. 2 shows a section through the construction according to Fig. 1 on the line A—B viewed in the direction of the arrows. Fig. 3 is a sectional detail.

In these figures, 1 indicates the motor or driving shaft provided with a hub to which the fly wheel disk 2 is attached by means of screw bolts which fly wheel is arranged to constitute one of the clutch members. To the fly wheel 2 there is attached by means of countersunk screws 4, the casing 5, which incloses the clutch parts and the gearing entirely. The shaft projects through a circular aperture. Close to this aperture in this casing are provided brackets 6 to each of which is pivoted at 7 one end of an arm 34, the other end of which is connected by a link 34ᵃ with a slidable collar or sleeve 26, the link being pivoted to the collar at 8.

In the interior of the casing 5 is placed upon the shaft 3 in a special closed casing 9 the well known planetary reversing gearing composed of the wheels 10, 11, 12, 13. At the end of the shaft 3 there is placed loose a revoluble disk 14 which engages permanently in the grooves 16 of a ring cast on the fly wheel disk by means of the teeth 15. The gear wheel 13 is screwed fast to the end of the hub of the disk 14, and near it is placed the wheel 10, which latter is firmly connected to the shaft 3 by means of the feather 17. The casing 9 is attached to the conical coupling disk 18 by means of bolts 19.

Within the casing 9 are placed close to the reversing gearing, the sliding bolts 20, which pass through the casing 9 at one end and at the other end through the sleeves 22, which latter are fixed in the walls of the clutch member 18. Upon these bolts are placed springs 21 which engage at one end against the parts 22 and at the other end against shoulders on the bolts 20. Close to the ends of the bolts 20 which project through the casing 9, there is a ball bearing consisting of two pressure disks or plates 23 with interposed anti-friction balls, of which the one is attached by countersunk screws to the bolts 20, while the other is held upon the first by means of screws and springs 24.

The lubrication of the bearing is effected through an opening 38 in the casing 5. By means of a projection 39, one of the plates 23 and consequently the lubrication channel 40 is always kept in the same position relative to the lubricating opening 38.

The casing 9 is prolonged in the shape of a sleeve 25, upon which is placed the collar 26 movable by means of the lever 30. The ends of the arms 34 rest on the outer bearing member 23 close to the sleeve 25 when the machine is running free or going backward, but when coupled up they rest in the annular groove 27. Upon the end of the sleeve the brake disk or element 31 is screwed. There is placed upon a projection of the sleeve 25 a ball bearing 28 which is under the pressure of a spring 29.

For the purpose of backward motion the brake disk or element is connected with the stationary brake ring 32. Behind this brake ring there is secured on the shaft 3 an annular hollow oil chamber 33, which is closed by a lid 35 and has a filling opening at a suitable part, which is closed by means of a screw 36. The shaft 3 has throughout its entire length a central passage 37, which is in connection by means of the radial borings 41, with the interior of the lubricating receptacle. At the bearings there are provided radial apertures 42. The bearing journal 43 in which the end of the shaft 3 is placed, is closed by means of an oil-tight lid 44 in such a manner that the oil cannot escape into the casing. Close to the lubricator 33 is placed the Cardan joint 45 inclosed in a casing 46.

The operation of the device is briefly as follows: By means of the controlling lever 30 the sleeve 26 is moved to the left. The end of the arm 34 presses against the outer bearing or pressure plate 23 through which the pressure is transmitted to the bolts 20, which in turn compress the springs 21 and the pressure thereof is transmitted to the clutch disk 18, the casing 9, the sleeve 25 and finally to the coupling disk 31. If previously the coupling was for rearward motion, then at a predetermined tension of the springs 21, the brake disk 31 is released from the brake ring 32 and the conical clutch disk 18 is coupled with the clutch member 2. During this movement arms 34 will be swung outward into a position parallel with the axis of sleeve 25, acting as cams during this movement, and in such parallel position will act as thrust members between the casing 5 and the thrust plate or disk, thereby avoiding any end thrust upon the actuating parts while the clutch members are held in engagement and locking the parts in this position. The clutch disk 18 is then propelled by the clutch member 2 in the same direction and it in turn propels through the gearing 10, 11, 12, 13, which now acts as a locked gearing, the shaft 3 so that the motor shaft and the screw shaft are revolving in the same direction. When reverse motion of the driven shaft is desired, the sleeve 26 is moved to the right, whereby the arms or members 34 are brought out of engagement with the plate or disk 23. On the further motion, the sleeve 26 presses against the ball bearing 28; the pressure transmitted from the controlling lever passes through the ball bearing and the springs 29 to the brake disk 31, the sleeve 25, the casing 9, and the clutch disk 18. The same is released from the fly wheel disk 2 and the brake disk 31 is brought into connection with the brake ring 32 so that the above named parts are quickly braked. The motor shaft and the fly wheel disk revolve continuously in the same direction. Through the disk 14 the gear wheel 13 is now revolved in the same direction. The wheel 13 engages with the wheels 11 (Fig. 2) which are thereby set in motion in the opposite direction. The gear wheels 11 in turn engage in the gear wheels 12, the teeth of which are so wide that they simultaneously engage in the teeth of the wheel 10. The wheels 12 consequently revolve in the same direction as the wheel 13. The wheel 10, which is fixed upon the shaft 3, is however revolved in the opposite direction, so that in this case the driven shaft revolves in the opposite direction. During this period the collars of the bolts 20 are pressed by the springs 21 against the casing 9. The pressure of the springs 21 holds them against the casing 9 and compensates fully for the clutch member 18. Consequently there is no thrust on the motor shaft either on direct drive forward, or reverse, or when the motor shaft is running idle.

What I claim and desire to secure by Letters Patent is:

1. In combination a driving shaft, a clutch member fast thereon, a driven shaft, a second clutch member movable longitudinally thereof, a casing connected with the fast clutch member and inclosing the movable clutch member, a movable pressure disk within the casing, yielding means for transmitting the movement of said disk to the movable clutch member, arms pivoted to the casing and bearing on the pressure disk, and means for moving said arms into positions perpendicular to the disk to move and lock said disk in clutch engaging position, substantially as described.

2. In combination a driving shaft, a clutch member fast thereon, a driven shaft, a second clutch member movable thereon, a casing connected with the fast clutch member and inclosing the movable member, a movable pressure disk, yielding pressure transmitting means between the movable clutch member and pressure disk, arms pivoted to the casing and having their ends bearing against the pressure disk, a sliding collar encircling the driven shaft with means for operating it, and links connecting said collar with the arms, substantially as described.

3. In combination a driving shaft, a clutch member fast thereon, a driven shaft, a movable clutch member thereon, a casing carried by the fast clutch member and inclosing the movable member, a pressure disk encircling the shaft within the casing, a second disk having an anti-friction bearing against said first named disk, pins slidably carried by the movable clutch member and having their heads engaged by said second disk, pressure springs between said pins and the movable clutch member, arms pivoted to the casing and bearing against the first named pressure plate, and means for swinging said arms, substantially as described.

In testimony whereof I have signed my name to this specification in the presence of two subscribing witnesses.

WILHELM STRUCK.

Witnesses:
HENRY HASPER,
WOLDEMAR HAUPT.